(12) United States Patent
Zhang et al.

(10) Patent No.: US 10,368,388 B2
(45) Date of Patent: Jul. 30, 2019

(54) METHOD FOR PEER TO PEER COMMUNICATION AND RELATED COMMUNICATION DEVICE

(71) Applicant: Sercomm Corporation, Taipei (TW)

(72) Inventors: Xujing Zhang, Taipei (TW); Lin Cheng, Taipei (TW)

(73) Assignee: Sercomm Corporation, Taipei (TW)

( * ) Notice: Subject to any disclaimer, the term of this patent is extended or adjusted under 35 U.S.C. 154(b) by 22 days.

(21) Appl. No.: 15/857,549

(22) Filed: Dec. 28, 2017

(65) Prior Publication Data
US 2018/0199396 A1    Jul. 12, 2018

(30) Foreign Application Priority Data

Jan. 11, 2017   (CN) .......................... 2017 1 0021059
Jan. 11, 2017   (CN) .......................... 2017 1 0532452

(51) Int. Cl.
| | | |
|---|---|---|
| *H04W 76/23* | (2018.01) | |
| *H04W 4/12* | (2009.01) | |
| *H04W 76/22* | (2018.01) | |
| *H04W 8/00* | (2009.01) | |
| *H04W 92/20* | (2009.01) | |
| *H04W 8/26* | (2009.01) | |

(52) U.S. Cl.
CPC .............. *H04W 76/23* (2018.02); *H04W 4/12* (2013.01); *H04W 76/22* (2018.02); *H04W 8/005* (2013.01); *H04W 8/26* (2013.01); *H04W 92/20* (2013.01)

(58) Field of Classification Search
CPC ....... H04W 80/04; H04W 8/26; H04W 84/12; H04W 88/08; H04W 88/06; H04W 84/18; H04W 74/08; H04L 12/56; H04L 2012/56; H04L 2012/5608; H04L 29/0653; H04L 29/06095; H04L 49/3009; H04L 49/309; H04L 45/74; H04Q 11/06; H04Q 11/04
USPC ..... 370/349, 389, 310.2, 328, 338, 392, 374
See application file for complete search history.

(56) References Cited

U.S. PATENT DOCUMENTS

| | | | |
|---|---|---|---|
| 9,893,894 B2* | 2/2018 | Stojanovski | .......... H04L 9/3247 |
| 10,206,128 B2* | 2/2019 | Panaitopol | ............ H04W 24/08 |
| 2010/0296448 A1 | 11/2010 | Vainikka | |

(Continued)

FOREIGN PATENT DOCUMENTS

| | | |
|---|---|---|
| CN | 103428888 A | 12/2013 |
| CN | 104869659 A | 8/2015 |

(Continued)

*Primary Examiner* — Brenda H Pham
(74) *Attorney, Agent, or Firm* — Winston Hsu (57) ABSTRACT

A method for P2P communication, for a first base station of a mobile communication system, where a base station interface is established between the first base station and a second base station of the mobile communication system is disclosed. The method comprises obtaining an IP address of a first user equipment and a TEID corresponding to a radio bearer established between the first user equipment and the first base station, and transmitting first routing information to the second base station via the base station interface, wherein the first routing information includes the IP address of the first user equipment, the TEID corresponding to the radio bearer between the first user equipment and the first base station, and an IP address of the first base station, wherein the base station interface does not pass through a core network of the mobile communication system.

4 Claims, 6 Drawing Sheets

(56) References Cited

U.S. PATENT DOCUMENTS

| | | | | |
|---|---|---|---|---|
| 2011/0296719 | A1* | 12/2011 | Sories | H04L 47/782 37/315 |
| 2013/0017837 | A1* | 1/2013 | Hakola | H04W 16/14 455/454 |
| 2013/0287012 | A1* | 10/2013 | Pragada | H04W 76/25 370/338 |
| 2014/0094122 | A1* | 4/2014 | Etemad | H04W 76/14 455/41.2 |
| 2014/0133456 | A1* | 5/2014 | Donepudi | H04W 88/10 370/331 |
| 2017/0280360 | A1* | 9/2017 | Salkintzis | H04W 76/14 |

FOREIGN PATENT DOCUMENTS

| | | |
|---|---|---|
| CN | 105228169 A | 1/2016 |
| CN | 106162765 A | 11/2016 |

* cited by examiner

METHOD FOR PEER TO PEER COMMUNICATION AND RELATED COMMUNICATION DEVICE

BACKGROUND OF THE INVENTION

1. Field of the Invention

The present invention relates to a method used in a communication device in a mobile communication system, and more particularly, to a method of peer to peer communication with base station interface.

2. Description of the Prior Art

With the gradual popularization of 4G technology and large-scale commercial use, users are demanding for more resources for data transmission and service, which increases the loading on the core network of the mobile communication system. The local internet protocol access (LIPA) technology and selected IP traffic offload (SIPTO) technology in certain scenario can be used for decreasing the loading of the core network.

On the other hand, peer to peer (P2P) communication is used for message exchanging between user equipments. However, in conventional P2P communication specification, data transmission between the user equipments requires assistance of the core network. In other words, the conventional P2P communication cannot bring the full benefits as LIPA or SIPTO proposed by the 4G LTE for traffic offloading from core network. Thus, the conventional P2P communication has the drawbacks, such as data transmission delay, overloading on the core network, and high data transmission cost.

SUMMARY OF THE INVENTION

It is therefore an objective to provide a method for peer to peer communication and related communication device to solve the above problem.

The present invention discloses a method for P2P communication, for a first base station of a mobile communication system, where a base station interface is established between the first base station and a second base station of the mobile communication system. The method comprises obtaining an IP address of a first user equipment and a TEID corresponding to a radio bearer established between the first user equipment and the first base station, and transmitting first routing information to the second base station via the base station interface, wherein the first routing information includes the IP address of the first user equipment, the TEID corresponding to the radio bearer between the first user equipment and the first base station, and an IP address of the first base station, wherein the base station interface does not pass through a core network of the mobile communication system.

The present invention discloses a method for P2P communication, for a first base station of a mobile communication system, where a base station interface is established between the first base station and a second base station of the mobile communication system. The method comprises obtaining an IP address of a first user equipment and a TEID corresponding to a radio bearer established between the first user equipment and the first base station, receiving a data transmission requesting message from the first user equipment, wherein the data transmission requesting message includes an IP packet and a target IP address of a target user equipment, transmitting an inquiry message to the second base station via the base station interface, receiving a routing information in response to the inquiry message from the second base station, wherein the routing information includes the target IP address of the target user equipment, a TEID corresponding to a radio bearer between the target user equipment and the second base station, and an IP address of the second base station, and storing the routing information, wherein the base station interface does not pass through a core network of the mobile communication system.

The present invention discloses a method for P2P communication, for a first base station of a mobile communication system, where a base station interface is established between the first base station and a second base station of the mobile communication system. The method comprises obtaining an IP address of a user equipment and a TEID corresponding to a radio bearer established between the user equipment and the first base station, receiving an inquiry message from the second base station via the base station interface, wherein the inquiry message includes a target IP address of a target user equipment, determining whether the target IP address is the same as the obtained IP address of the user equipment, and transmitting a routing information in response to the inquiry message to the second base station via the base station interface if the target IP address is the same as the IP address of the user equipment, wherein the routing information includes the IP address of the user equipment, the TEID corresponding to the radio bearer between the user equipment and the first base station, and an IP address of the first base station, wherein the base station interface does not pass through a core network of the mobile communication system.

These and other objectives of the present invention will no doubt become obvious to those of ordinary skill in the art after reading the following detailed description of the preferred embodiment that is illustrated in the various figures and drawings.

DETAILED DESCRIPTION

Detailed Operations are Illustrated with Figures as Follows.

Figure 1:
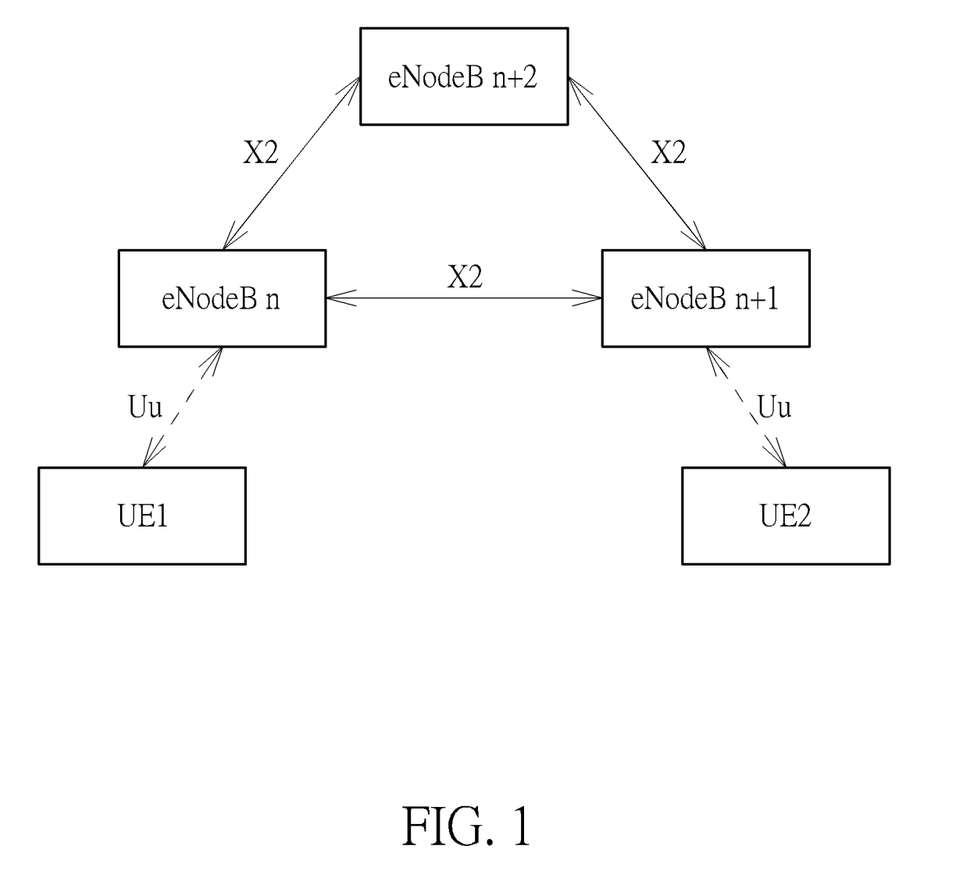
FIG. 1 is a schematic diagram of a mobile communication system.

Please refer to FIG. 1, which is a schematic diagram of a mobile communication system. The mobile communication system is a long term evolution (LTE) system or another generation of mobile communication system, and is briefly composed of user equipments (UEs) UE1-UE2 and base stations eNodeB n to eNodeB n+2, wherein the UE1 and the eNodeB n communicates via Uu transmitting interface, and the UE2 and the eNodeB n+1 communicates via Uu transmitting interface. In this embodiment, the UE1-UE2 are in the same local network, where a plurality of base stations are aggregated and connected with each other via a base station interface (e.g. X2 interface defined in LTE specification).

Note that, the base station interface is established between any two base stations, but does not go through the core network. In addition, in this document, the terms defined in the LTE system are used for illustrating the concept of the present invention. However, the present invention is not so limited. The base stations eNodeB n to eNodeB n+2 could be small cells. Any two or more than two base stations could be different cells of one base station, and they could communicate with each other through an interior interface of the base station.

In order to decrease the loading of the core network, and reduce data transmission delay and cost, the present invention proposes a P2P mechanism with a base station interface between base stations. Thus, data transmission does not go through core network (e.g. Evolved/Enhanced Packed Core or other kind of backbone network), so as to achieve traffic offloading from core network. For example, in FIG. 1, the data of UE1 is transmitted from the base station eNodeB n to the base station eNodeB n+1 via the base station interface when the UE1 communicates with UE2, and then the base station eNodeB n+1 transmits the data of the UE1 to the UE2. In other words, the present invention discloses that a network (i.e. base stations eNodeB n to eNodeB n+2 of FIG. 1), with base station interface established, generates a routing information for the UE, so that the source base station determines whether the information for the target UE is included in the routing information when the source UE wants to transmits data to the target UE. The source base station transmits the data to the target base station serving the target UE via the base station interface when the information of the target UE is included in the routing information, whereas the source base station transmits the data to the core network via the base station to core network interface when the information of the target UE is not included in the routing information, and then the core network transmits the data to the target base station. A base station could communicate with the core network through a serving gateway (S-GW) in the core network.

Figure 2:
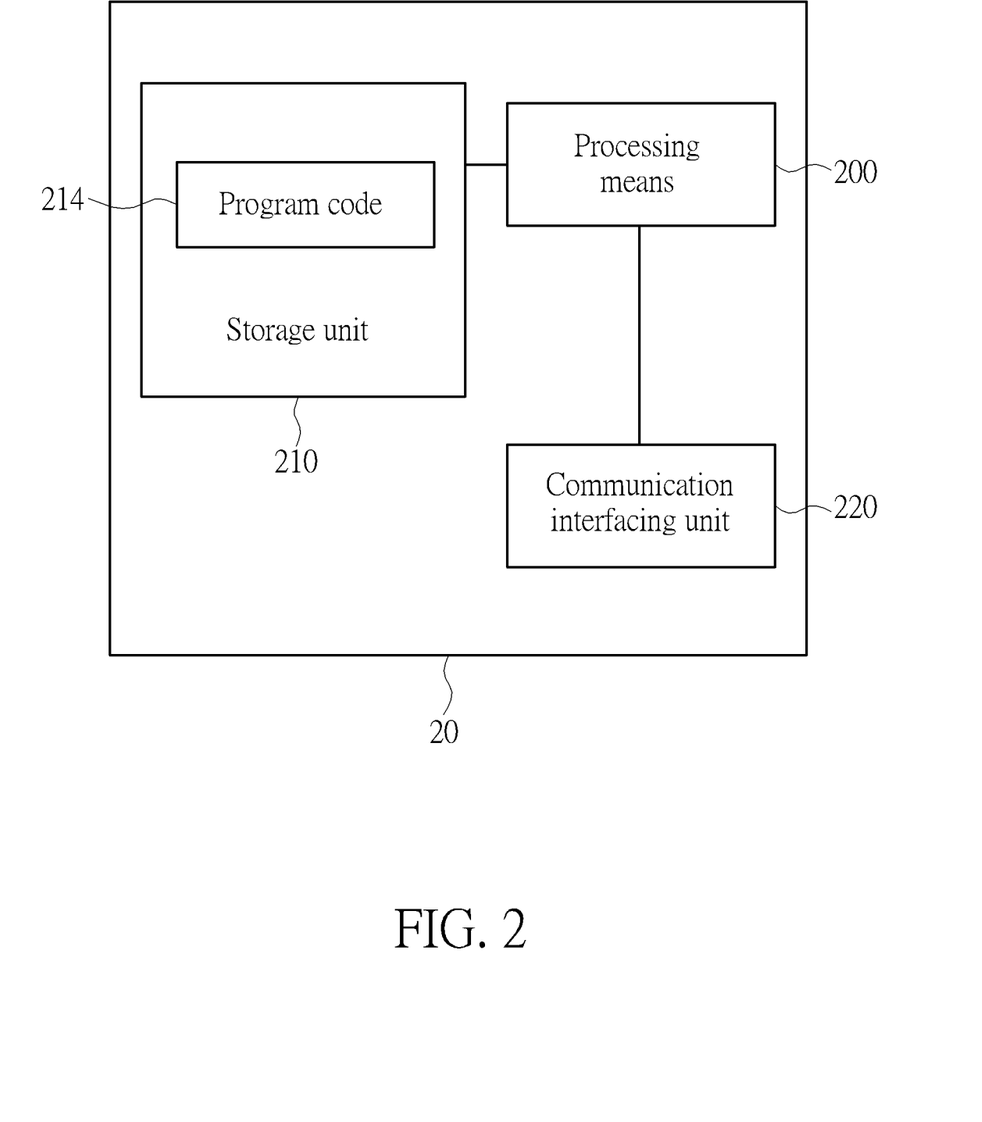
FIG. 2 is a schematic diagram of an exemplary communication device.

FIG. 2 illustrates a schematic diagram of an exemplary communication device 20. The communication device 20 can be the base station, and includes a processing means 200 such as a microprocessor or Application Specific Integrated Circuit (ASIC), a storage unit 210 and a communication interfacing unit 220. The storage unit 210 may be any data storage device that can store program code 214 to be accessed by the processing means 200. The communication interfacing unit 220 is preferably a radio transceiver and can exchange wireless signals with a network according to processing results of the processing means 200.

Figure 3:
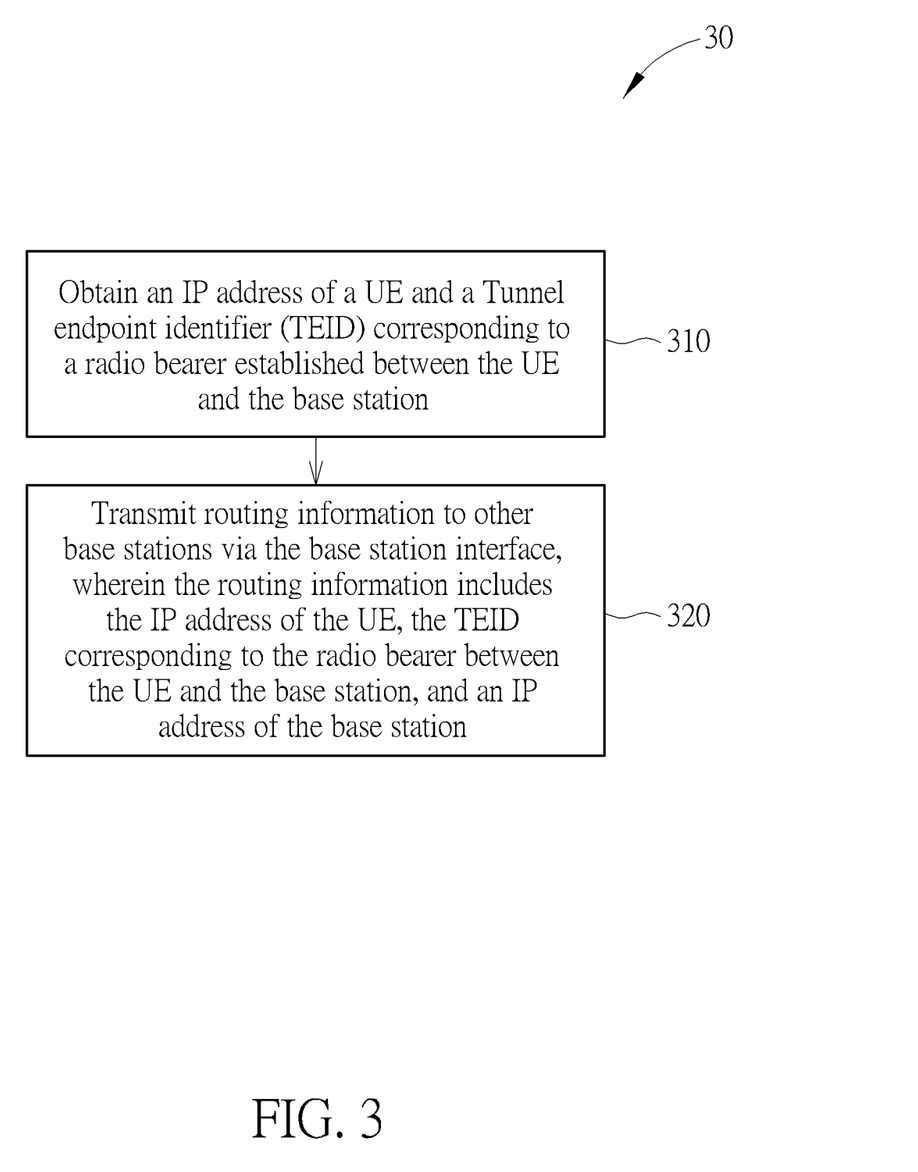
FIGS. 3-4 are flowcharts of a process according to an example of the present disclosure.

Please refer to FIG. 3, which is a flowchart of a process 30 according to an example of the present disclosure. The process 30 is utilized in a base station of the local network of FIG. 1, for establishing routing information for the UE. The process 30 may be compiled into a program code 214 to be stored in the storage unit 210, and may include the following steps:

Step 310: Obtain an IP address of a UE and a Tunnel endpoint identifier (TEID) corresponding to a radio bearer established between the UE and the base station.

Step 320: Transmit routing information to other base stations via the base station interface, wherein the routing information includes the IP address of the UE, the TEID corresponding to the radio bearer between the UE and the base station, and an IP address of the base station.

According to process 30, the base station includes the obtained IP address of the UE, the IP address of the base station serving the UE, and the TEID corresponding to the radio bearer between the UE and the base station into the routing information, and then selects apart of or all base station interfaces for transmitting the routing information. Thus, the base stations receiving the routing information store the routing information, to establish routing information for UEs in the local network. In an embodiment, the IP address of the UE, the IP address of the base station and the TEID could be obtained by the base station with an attach procedure or radio bearer establishment procedure, but it is not limited herein.

In a word, the routing information includes three parameters, a first parameter for indicating the IP address of the UE, a second parameter for indicating the TEID corresponding to the radio bearer between the UE and the base station, and a third parameter for indicating the IP address of the base station. Note that, in an embodiment, the base station deletes the routing information corresponding to the UE when the UE performs the detach procedure, and may further notify other base stations to delete the related routing information.

After the routing information is established, the source UE transmits data transmission requesting message to the source base station when source UE wants to transmit data to the target UE, wherein the data transmission requesting message includes the IP packet and the IP address of the target UE. The source base station determines whether the IP address of the target UE of the data transmission requesting message is included in the stored routing information. The source base station inquires the IP address of the target base station of the routing information and the TEID corresponding to the radio bearer between the target UE and target base station if the IP address of the target UE is included in the stored routing information. In other words, source base station determines whether the IP address of the target UE is the same as any of the stored first parameters of the routing information. The source base station gets the first, second and third parameters of the matching piece of the routing information, where the IP address of the target UE is the same as the first parameter of the matching piece of the routing information. In addition, the source base station includes the TEID indicated in the second parameter in the IP packet, and transmits the IP packet to the IP address of the target base station indicated in the third parameter via the base station interface. Then, the target base station receiving the IP packet selects corresponding target UE according to the TEID of the IP packet, and transmits the IP packet to the target UE via the Uu transmission interface. However, the source base station transmits the IP packet to the core network if the IP address of the target UE is not included in the stored routing information, and then the core network transmits the IP packet to the target base station. Finally, the target base station transmits the IP packet to the target UE.

Figure 4:
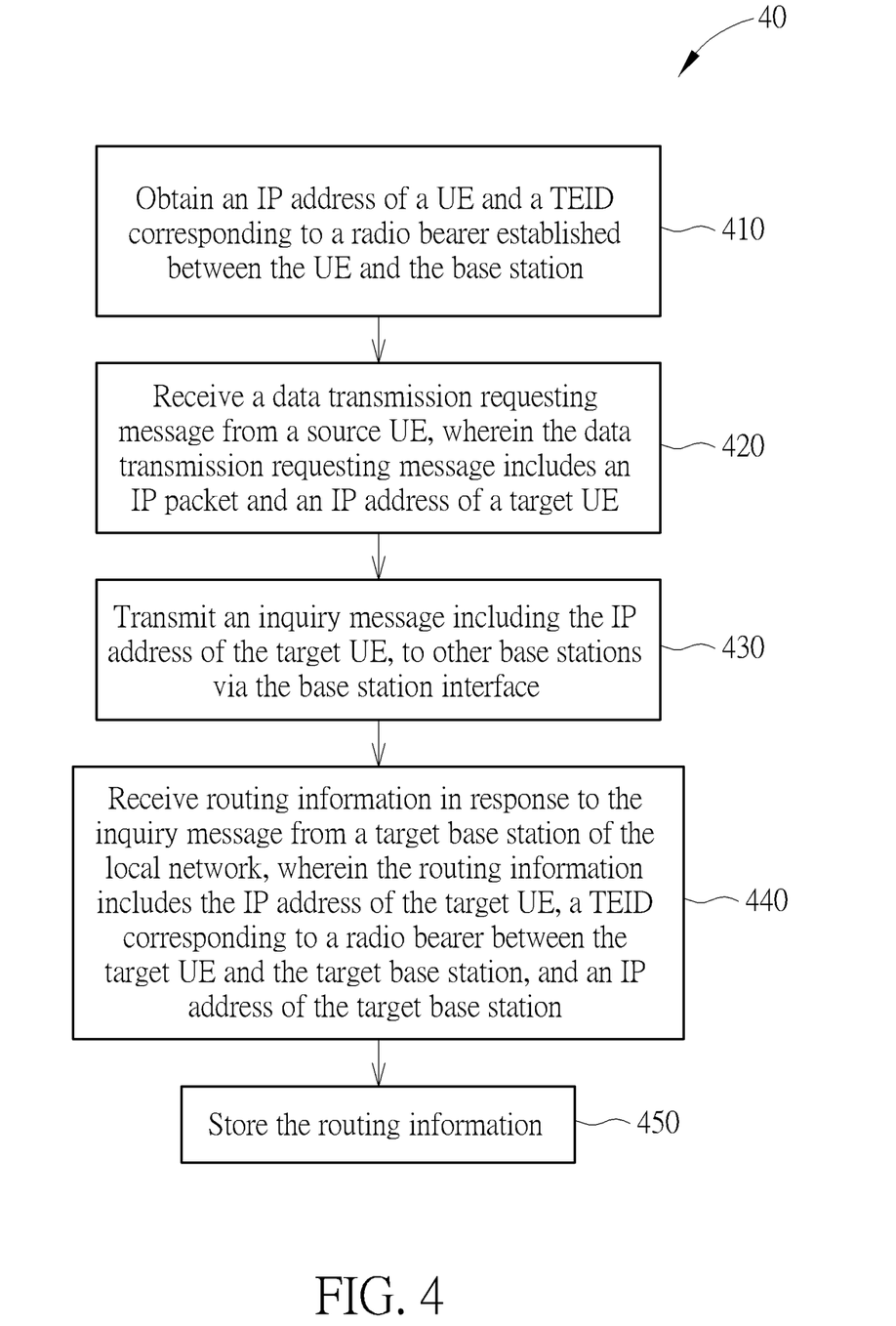

Please refer to FIG. 4, which is a flowchart of a process 40 according to an example of the present disclosure. The process 40 is utilized in a base station of the local network of FIG. 1, for establishing routing information for the UE. The process 40 may be compiled into a program code 214 to be stored in the storage unit 210, and may include the following steps:

Step 410: Obtain an IP address of a UE and a TEID corresponding to a radio bearer established between the UE and the base station.

Step 420: Receive a data transmission requesting message from a source UE, wherein the data transmission requesting message includes an IP packet and an IP address of a target UE.

Step 430: Transmit an inquiry message including the IP address of the target UE, to other base stations via the base station interface.

Step 440: Receive routing information in response to the inquiry message from a target base station of the local network, wherein the routing information includes the IP address of the target UE, a TEID corresponding to a radio bearer between the target UE and the target base station, and an IP address of the target base station.

Step 450: Store the routing information.

According to the process 40, after the base station obtains a piece of routing information that contains the IP address of a UE, the IP address of a base station serving that UE, and the TEID of a radio bearer between that UE and that target base station, the base station does not directly transmit that piece of routing information. After a base station receives data transmission requesting message from a UE, the base station extracts the IP address of the target UE of the data transmission requesting message. After that, the base station transmits the inquiry message for inquiring the piece of routing information related to the IP address of the target UE to other base stations via base station interfaces. On the other hand, the base stations receiving the inquiry message match the IP address of the target UE of the inquiry message with the first parameters of the routing information. If the IP address of the target UE of the inquiry message is the same as any of the first parameters of the routing information, the base stations transmit the relevant piece of routing information to the inquiry base station via the base station interface. The transmitted relevant piece of routing information includes the IP address of the target UE, the IP address of the target base station and TEID corresponding to the radio bearer between the target UE and the target base station. After the inquiry base station receives the piece of routing information, it stores the routing information, to finish the routing information establishment procedure. On the contrary, if the IP address of the target UE of the inquiry message is not the same as any of the first parameters of the routing information, the base station ignores the received inquiry message.

In other words, the source base station obtains the IP address of the target UE, the IP address of the target base station and the TEID when the routing information establishment procedure is finished. The source base station then transmits the user data packet to the target base station via the base station interface according to the IP address of the target base station of the routing information. Note that, the source base station includes the TEID in the user data packet. Thus, the target base station receiving the user data packet selects the target UE according to the TEID of the user data packet, and transmits the IP packet to the target UE via the Uu transmission interface.

Figure 5:
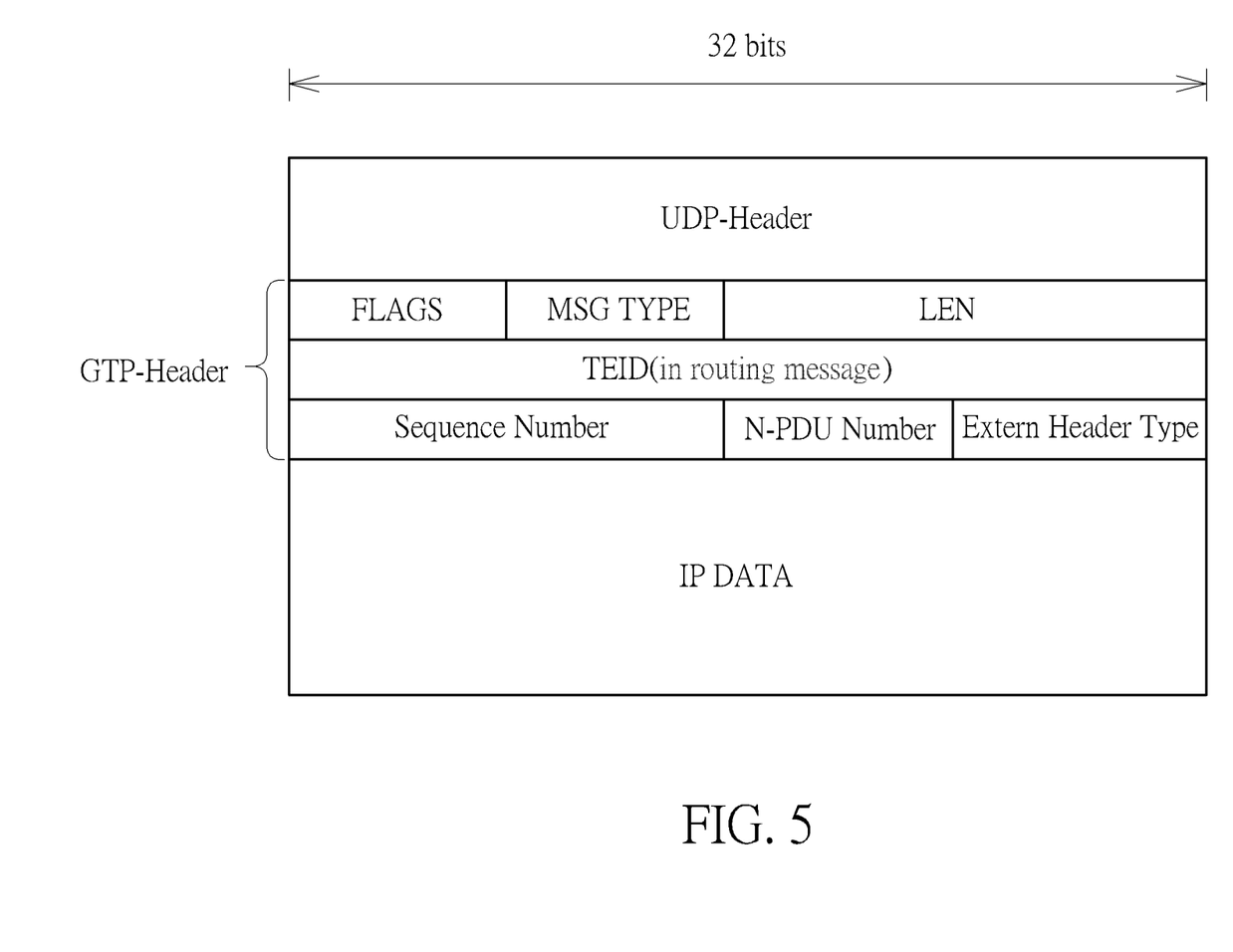
FIG. 5 is a schematic diagram of a format of a user data packet according to an example of the present disclosure.

FIG. 5 is a schematic diagram of a format of a user data packet according to an example of the present disclosure. The user data packet includes an user datagram protocol header (UDP-Header), a general packet radio service tunneling protocol Header (GTP-Header), and IP DATA, wherein the TEID of the GTP-Header is configured by the source base station according to the TEID (namely the second parameter of the routing information) corresponding to the radio bearer between the target UE and target base station of the routing information. Thus, the target base station is able to selects a UE (namely the target UE) for the user data packet transmission according to the TEID after the target base station receives the user data packet. As shown in FIG. 5, GTP-Header further includes "FLAGS" field, "MSG TYPE" field, "LEN" field, "Sequence Number" field, "N-PDU Number" field, and "Extern Header Type" field. Note that, user data packet format should be well known in the art, so it is omitted herein. The source base station includes the TEID of the routing information into the TEID field of the GTP-Header of FIG. 5 when the source base station generates the user data packet, so that the target base station could transmit the IP packet to the correct target UE according to the TEID.

Figure 6:
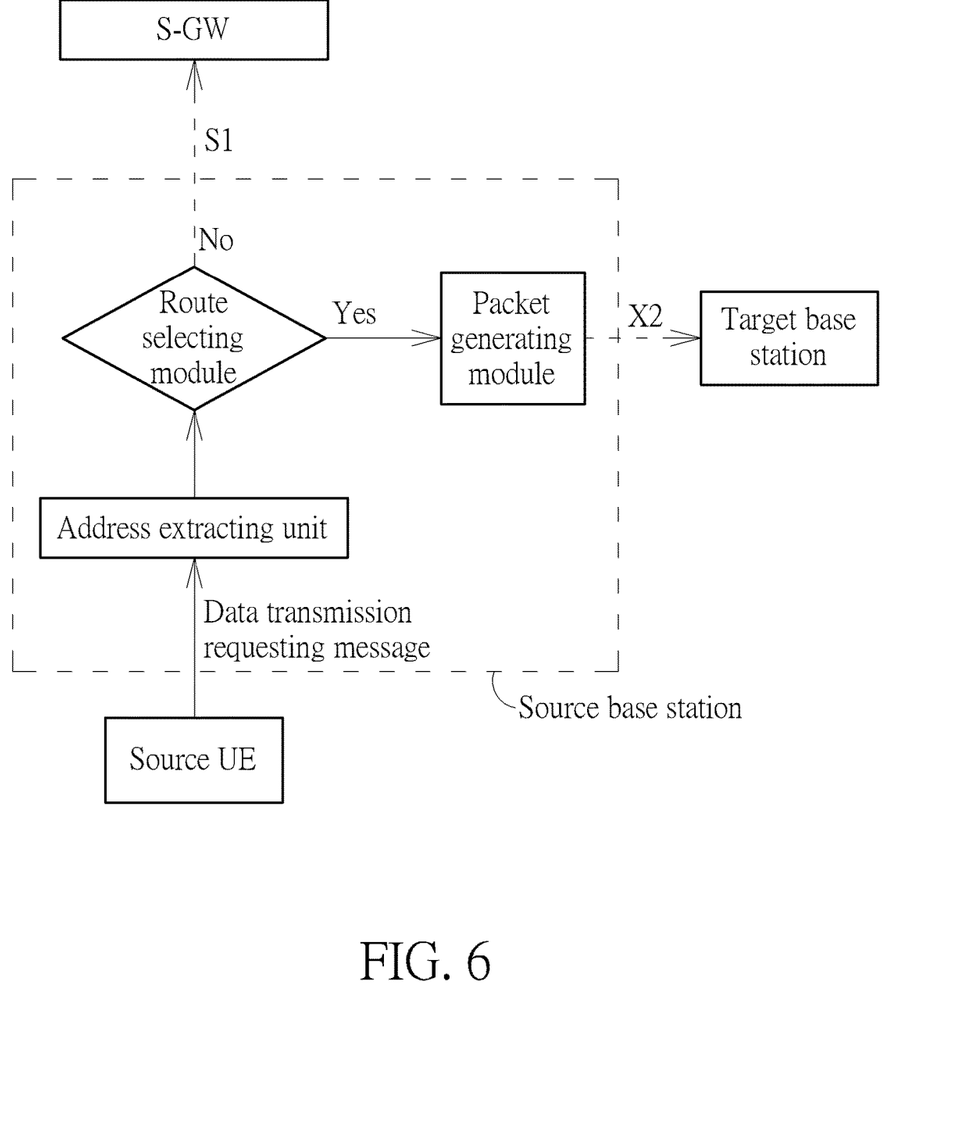
FIG. 6 is a schematic diagram of a base station according to an example of the present disclosure.

FIG. 6 is a schematic diagram of a data transmission in a source base station according to an example of the present disclosure. The source base station includes at least two communication interface units for establishing base station interface (e.g. X2 interface of the LTE system) and base station to core network interface (e.g. S1 interface of the LTE system) for transmitting IP packet to other base stations (e.g. the target base station) and S-GW, respectively. The source base station further includes an address extracting unit, a route selecting module, and a packet generating module. The address extracting unit receives data transmission requesting message from the source UE via the Uu transmission interface and extracts the IP address of the target UE and the IP packet. The route selecting module stores the routing information, where the routing information establishment procedure could be referred from abovementioned processes 30-40. The packet generating module generates the user data packet including the IP packet. The detailed description for the data transmission in the source base station is as follows. After the source base station receives the IP packet transmission requesting message from the source UE, the address extracting unit (e.g. PDCP layer of the LTE system) obtains the IP address of the target UE from the data transmission requesting message, and then transmits the IP address of the target UE to the route selecting module. The route selecting module matches the IP address of the target UE with the first parameter of the routing information. If the IP address of the target UE is not matched to the IP addresses indicated in the first parameters of the routing information, the route selecting module transmits the IP packet to the S-GW of the core network via the base station to core network interface (e.g. the S1 interface). On the other hand, if the IP address of the target UE is matched to the IP address indicated in a first parameter of the routing information, the route selecting module obtains the second and third parameters of the same piece of routing information, and transmits the IP packet with the first, second, and third parameter to the packet generating module. The packet generating module includes the UDP-Header, GTP-Header into the IP packet, configures the "TEID" field with the second parameter of the routing information, and transmits the IP packet to the target base station via the base station interface according to the IP address of the target base station indicated in the third parameter of the routing information.

In conclusion, the present invention provides a method of peer to peer communication with base station interface. In detail, base stations interconnected through base station interface is able to obtain the IP address of the target base station and the TEID corresponding to the radio bearer of the target UE according to the routing information establishment procedure, so that the IP packet can be transmitted between the base stations without assistance of the core network. Hence, the loading of the core network is decreased. Thus, the peer to peer communication method proposed by the present invention could realize traffic offloading from core network and decreases transmission cost and transmission delay.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for P2P communication, for a first base station of a mobile communication system, where a base station interface is established between the first base station and a second base station of the mobile communication system, the method comprising:
   obtaining an IP address of a first user equipment and a TEID corresponding to a radio bearer established between the first user equipment and the first base station;
   transmitting first routing information to the second base station via the base station interface, wherein the first routing information includes the IP address of the first user equipment, the TEID corresponding to the radio bearer between the first user equipment and the first base station, and an IP address of the first base station;
   receiving second routing information from the second base station via the base station interface, wherein the second routing information includes an IP address of a second user equipment, a TEID corresponding to a radio bearer between the second user equipment and the second base station, and an IP address of the second base station;
   storing the second routing information;
   receiving a data transmission requesting message from the first user equipment, wherein the data transmission requesting message includes an IP packet and a target IP address of a target user equipment;
   determining whether the target IP address is the same as the IP address of the second user equipment in the second routing information;
   obtaining the TEID corresponding to the radio bearer between the second user equipment and the second base station and the IP address of the second base station in the second routing information if the target IP address is the same as the IP address of the second user equipment in the second routing information;
   generating a user data packet, wherein the user data packet includes a user datagram protocol header (UDP-Header), a general packet radio service tunneling protocol header (GTP-Header) and the IP packet, and a TEID field of the GTP-Header is configured according to the TEID corresponding to the radio bearer between the second user equipment and the second base station in the second routing information; and
   transmitting the user data packet to the second base station via the base station interface according to the IP address of the second base station in the second routing information;
   wherein the base station interface does not pass through a core network of the mobile communication system.

2. A method for P2P communication, for a first base station of a mobile communication system, where a base station interface is established between the first base station and a second base station of the mobile communication system, the method comprising:
   obtaining an IP address of a first user equipment and a TEID corresponding to a radio bearer established between the first user equipment and the first base station;
   receiving a data transmission requesting message from the first user equipment, wherein the data transmission requesting message includes an IP packet and a target IP address of a target user equipment;
   transmitting an inquiry message to the second base station via the base station interface;
   receiving routing information in response to the inquiry message from the second base station, wherein the routing information includes the target IP address of the target user equipment, a TEID corresponding to a radio bearer between the target user equipment and the second base station, and an IP address of the second base station;
   storing the routing information;
   obtaining the TEID corresponding to the radio bearer between the target user equipment and the second base station in the routing information, and an IP address of the second base station;
   generating a user data packet, wherein the user data packet includes a user datagram protocol header (UDP-Header), a general packet radio service tunneling protocol header (GTP-Header) and the IP packet, and a TEID field of the GTP-Header is configured according to the TEID corresponding to the radio bearer between the target user equipment and the second base station in the routing information; and
   transmitting the user data packet to the second base station via the base station interface according to the IP address of the second base station in the routing information;
   wherein the base station interface does not pass through a core network of the mobile communication system.

3. A method for P2P communication, for a first base station of a mobile communication system, where a base station interface is established between the first base station and a second base station of the mobile communication system, the method comprising:
   obtaining an IP address of a user equipment and a TEID corresponding to a radio bearer established between the user equipment and the first base station;
   receiving an inquiry message from the second base station via the base station interface, wherein the inquiry message includes a target IP address of a target user equipment;
   determining whether the target IP address is the same as the obtained IP address of the user equipment; and
   transmitting a routing information in response to the inquiry message to the second base station via the base station interface if the target IP address is the same as the IP address of the user equipment, wherein the routing information includes the IP address of the user equipment, the TEID corresponding to the radio bearer between the user equipment and the first base station, and an IP address of the first base station;
   wherein the base station interface does not pass through a core network of the mobile communication system.

4. The method of claim 3, further comprising:
   receiving an IP packet from the second base station, wherein the IP packet includes a TEID field configured according to the TEID corresponding to the radio bearer between the user equipment and the first base station in the routing information; and
   transmitting the IP packet to the target user equipment according to the TEID field.

* * * * *